United States Patent [19]

Starr

[11] 3,967,432
[45] July 6, 1976

[54] PANEL EDGE FASTENER RECEPTACLE AND JOINT

[75] Inventor: Victor B. Starr, Aston, Pa.

[73] Assignee: Southco, Inc., Lester, Pa.

[22] Filed: July 23, 1975

[21] Appl. No.: 598,325

[52] U.S. Cl. .................. 52/758 D; 52/582; 52/584; 85/32 R; 151/41.75
[51] Int. Cl.² ............................ F16B 5/02
[58] Field of Search ........ 52/758 D, 753 C, 753 D, 52/758 F, 753 F, 753 E, 582, 584; 85/32 R, 32 K; 151/41.75

[56] References Cited
UNITED STATES PATENTS

| | | | |
|---|---|---|---|
| 2,993,573 | 7/1961 | Bloedow | 85/32 R X |
| 3,110,338 | 11/1963 | Rapata | 151/41.75 |
| 3,461,937 | 8/1969 | Finney | 151/41.75 |
| 3,498,655 | 3/1970 | Arms et al. | 52/758 D X |
| 3,527,280 | 9/1970 | MacNorius | 151/41.75 |

Primary Examiner—Werner H. Schroeder
Assistant Examiner—Wayne L. Shedd
Attorney, Agent, or Firm—Paul & Paul

[57] ABSTRACT

A fastener receptacle, preferably having a threaded hole formed axially therein, is installed in an opening prepared at the edge of a first member, which is usually a thin rigid plate or panel. The receptacle is used to releasably attach the first member, at its edge, to the surface of a second member, the planes of the first and second members being at right angles to each other. A threaded fastener, such as a screw, is inserted through a hole prepared in the second member and into the threaded hole in the receptacle at the edge of the first member.

17 Claims, 6 Drawing Figures

PANEL EDGE FASTENER RECEPTACLE AND JOINT

BACKGROUND OF THE INVENTION

This invention relates to fastening devices and particularly to fastening devices for assembling together two members the first of which is usually a thin rigid panel, such as sheet metal, which is to be releasably attached, in perpendicular or substantially perpendicular position, to a second member.

More particularly, the present invention relates to means for removably attaching a first member, such as a thin panel, at its edge, to a second member, in a perpendicular position relative thereto.

In the prior art, fastening of a thin panel member at its edge to a second member, perpendicularly thereto, was accomplished either by bending a flange on the thin panel member or by the addition of a frame member to the edge of the thin member. A threaded fastener was then used having male and female component parts. Prior to assembly, either the male or the female component was attached by mechanical means to the flange of the thin member, or to the additional frame member. Or, both the male and female component parts of the fastener were applied separately at time of assembly.

SUMMARY OF THE INVENTION

An object of the present invention is to provide improved means for removably attaching a thin member, such as a sheet metal panel, to another member in a perpendicular relationship thereto.

Another object is to provide fastening means for removably attaching a thin-walled member to another member at an obtuse angular relationship thereto, usually perpendicular, without requiring the provision of either a flange on the thin-walled member or the provision of an additional frame member.

These and other objects of invention are accomplished, in accordance with the present invention, by providing a fastener receptacle, preferably having a threaded hole formed axially therein, and providing a suitable opening in the thin-walled member at or near its edge, for receiving and holding the receptacle. A screw fastener is passed through the second member and is received within the threaded axial hole of the receptacle, whereby it functions to hold the second member at the edge of the thin-walled first member.

The foregoing and other objects of the invention are achieved, according to a preferred embodiment, by providing a generally cylindrical fastener receptacle R which may readily be snapped into an opening prepared at the edge of the panel. Once installed, the snap-in receptacle is locked securely in the opening at the edge of the thin-walled member.

DETAILED DESCRIPTION OF THE PREFERRED EMBODIMENTS

Figure 1:
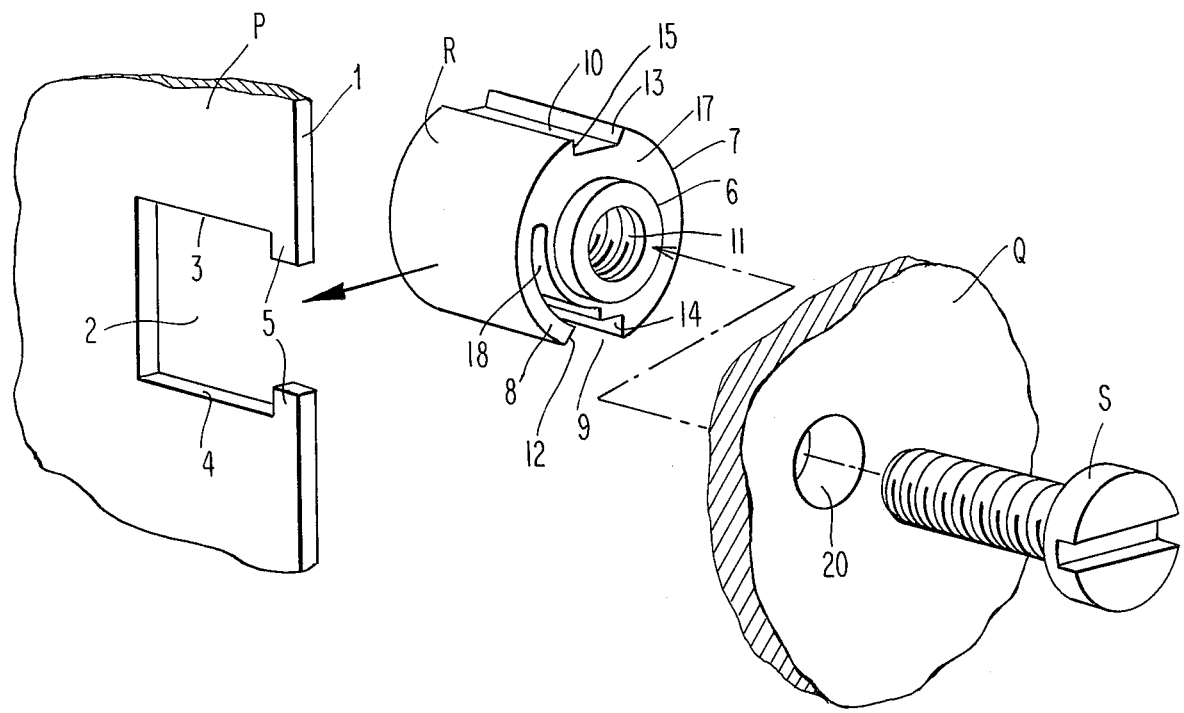
FIG. 1 is a exploded perspective view showing, from left to right, a fragmentary portion of the thin-walled panel member and the opening prepared at the edge thereof for receiving the receptacle, the generally cylindrical receptacle having a threaded hole formed axially therein, a second member to which the thin-walled panel member is to be secured in perpendicular relationship, and lastly the fastening screw.

Referring now to FIG. 1, a first member P, ordinarily a thin-walled rigid metal panel member, such as sheet metal, is to be removably fastened in perpendicular position to a second member Q. The second member Q, which is illustrated as being somewhat thicker then the first panel member P, has a hole 20 therethrough for passing the fastener screw S.

In accordance with the present invention, the edge 1 of the thin-walled panel member P is secured by the fastener receptacle R and screw S, in abutting relation to the flat surface of the second member Q. In a preferred form, the receptacle R is generally cylindrical, as illustrated in FIGS. 1–4.

For installing the generally cylindrical receptacle R at the edge of the thin-walled member P, the member P is provided with a shaped opening 2 having upper and lower edges or sides 3 and 4 which are generally perpendicular to edge 1 of the member P. The dimension of the opening 2 is reduced at the edge 1 by a pair of tabs 5, one tab of which projects downwardly and the other upwardly along the panel edge 1.

The generally cylindrical receptacle R has a reduced diameter portion 6 at the front end thereof which is adapted to fit into the reduced dimension portion of the opening 2, between the tabs 5. The tabs 5 are adapted to bear against the front surface 17 of the full diameter portion 7 of receptacle R and thereby function to retain the receptacle within the opening 2, after the receptacle R has been snapped into locked position in the opening, as will be described.

The main body portion 7 is formed to have a first peripheral recess 9 and, diametrically opposite thereto, a second peripheral recess 10. Extending circumferentially, within the main body 7, from recess 9 toward but terminating short of recess 10, is a slot 18. The radially inward surface of the slot 18 is more inward than the bottom of recess 9, for a reason which will become clear. The slot 18 forms a tongue 8 one end of which is free and the other end of which is integral with the body portion 7. Since the body 7 is of resilient material, preferably hard resilient plastic, the tongue 8 functions as a spring member. The receptacle R has an axial hole or bore 11 which is preferably threaded to engage the externally threaded fastener screw S.

Figure 2:
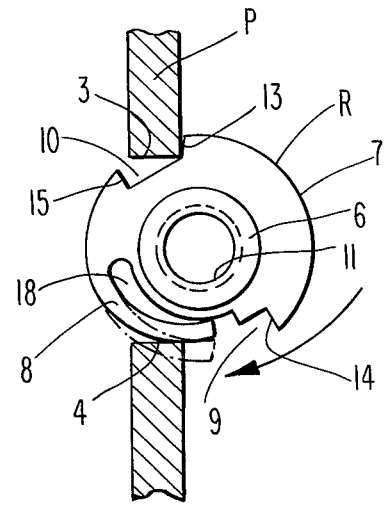
FIG. 2 is a view illustrating how the receptacle is rotated into position within the opening prepared in the thin-walled panel.

The manner in which the receptacle R is installed within the opening 2 of the panel P is illustrated in FIG. 2. As will be clear from FIG. 2, the receptacle R is placed at the opening 2 in such position that the sidewall 13 of the recess 10 of the receptacle R is at the side 3 of the opening 2 of the panel P and the outer surface of tongue 8 is against the edge 4 of the opening. The receptacle R is then turned rotationally, clockwise as viewed in FIG. 2, so that the tongue or spring element 8 is forced, by contact with the edge or side 4 of the opening, to flex inwardly into the slot 18, as shown in solid line in FIG. 2. Continued urging of the receptacle R in the clockwise direction brings it to its final locked-in position, illustrated in FIG. 3, in which the recess 9 of the receptacle receives the side 4 of the opening 2 in the panel P. In this final locked-in position, the resilient spring element 8, which was compressed and flexed inwardly during installation, has snapped back and returned to its original unflexed position. The receptacle is now locked within the opening 2 of the panel P by the end or edge 12 of the spring element 8. The edge 12 may preferably be angled slightly, as shown, in order to facilitate snapping the receptacle through the opening and into its final position. The sidewall 13 of the recess 10 of the receptacle R may also preferably be inclined, as illustrated, so that it may abut as shown in FIG. 2 against the side 3 of the thin-walled panel P at the start of the installation process.

Figure 3:
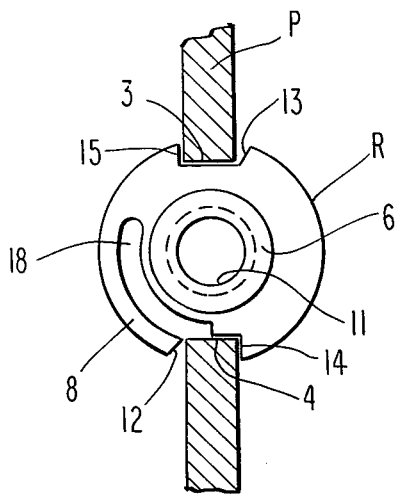
FIG. 3 shows the receptacle locked in position within the opening in the thin-walled panel.

When the receptacle R is in its final installed position, as illustrated in FIG. 3, the sidewall 15 of recess 10, and the sidewall 14 of recess 9, function to bear against opposite sides of the thin walled panel member P at the edges 3 and 4, respectively, of opening 2 and thus function to resist the torque to which the receptacle R is subjected when a threaded screw fastener S is inserted through the hole 10 and into the tapped hole 11 of the receptacle. In similar manner, the sidewall 13 of recess 10, and the face 12 of the spring member 8, function to resist the torque to which receptacle R is subjected when the screw fastener S is rotated a counterclockwise loosening direction.

Figure 6:
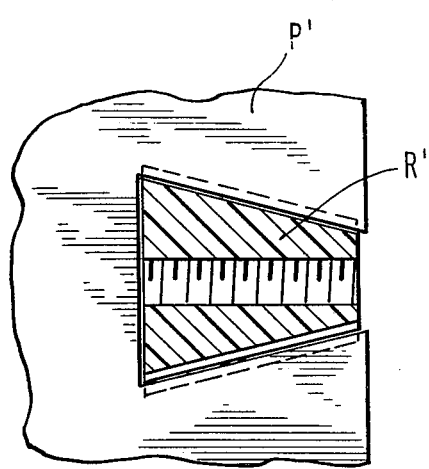
FIG. 6 is a fragmentary elevational view showing the frusto-conical fastener locked in position in the frusto-conical opening the the thin-walled panel.
Figure 4:
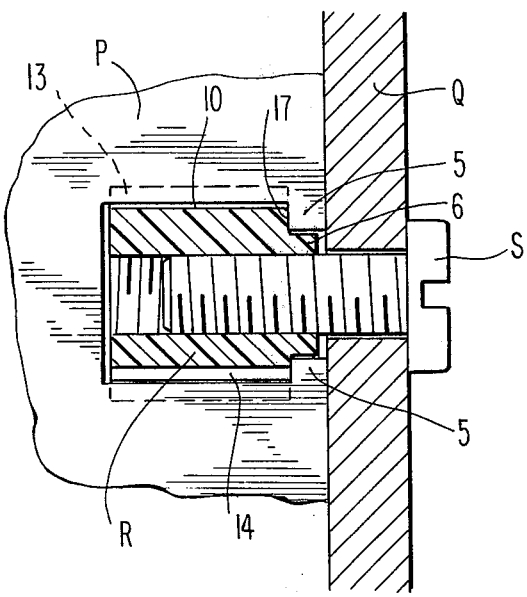
FIG. 4 is an elevational view, in section, showing the thin-walled panel secured at right angles to the second member by the receptacle and fastening screw, in accordance with the present invention.
Figure 5:
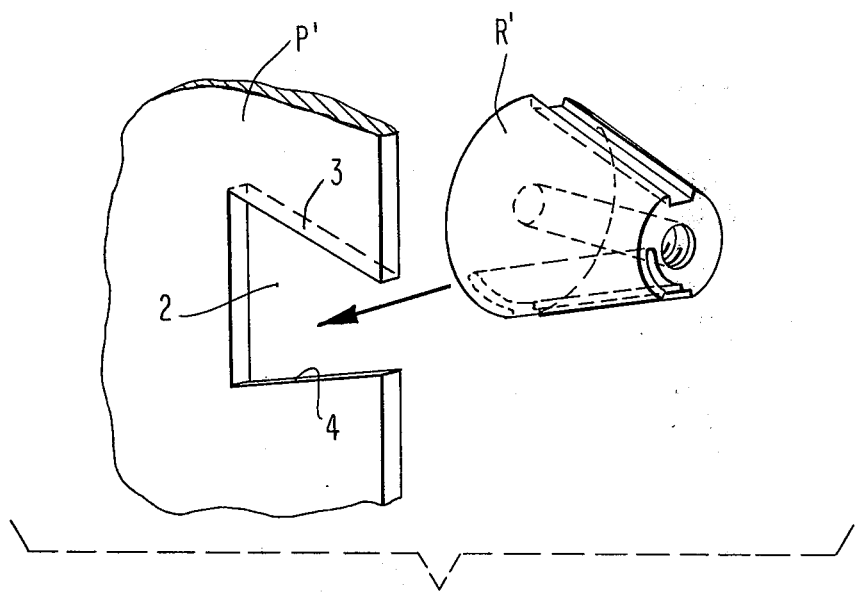
FIG. 5 illustrates an alternate configuration of the receptacle, namely, a frusto-conical configuration, and a correspondingly shaped hole.

FIGS. 5 and 6 illustrate a modification in which the receptacle R is frusto-conical in shape and in which the opening in the panel P' has inclined upper and lower edges corresponding to the inclined surfaces of the upper and lower recesses in the frusto-conical receptacle R'. It will be understood that the small diameter end of the frusto-conical receptacle R' has a diameter corresponding to the reduced dimension of the opening 2 at the edge of the panel P'. It will further be understood that the receptacle R', after installation in the opening 2 of the panel P', is retained against being removed in a forward direction by the wedging action of the inclined sides 3 and 4 of the opening. In other respects, the frusto-conical receptacle R', both as to its construction and as to its manner of installation in the opening of the panel P', is similar to the generally cylindrical receptacle R illustrated in FIGS. 1–4.

The new receptacle has a number of advantages over prior art fastener and fastening techniques. One, the receptacle is inexpensive to manufacture, since it consists of a single plastic part which may be produced by molding. Two, the receptacle is quickly and easily snapped into position by hand action. Three, no flange or additional member need be added to the panel P. Four, the resilient plastic material of which the receptacle is molded provides threads in the axial bore which resist loosening in the presence of vibration. And, finally, the threads are non-corrosive.

What is claimed is:
1. A fastener receptacle adapted for installation at the edge of a thin panel, said receptacle comprising:
   a. a body of resilient material;
   b. a peripheral spring element having one end integral with said body and the other end free;
   c. a first peripheral recess located adjacent said other end of said spring element;
   d. a second peripheral recess diametrically opposite said first recess;
   e. said first and second recesses adapted to engage and cooperate with the edges of an opening prepared in said panel in which said receptacle is to be installed;
   f. said spring element being adapted to be flexed inwardly toward the center of said body by one edge of said panel opening during installation and then to return outwardly to its unflexed position as, during installation, the spring element passes beyond said edge of said panel opening, said spring element in its unflexed outward position being adapted to retain said receptacle in said panel opening.
2. A fastener receptacle according to claim 1 wherein:
   a. said receptacle body has a portion of reduced cross-section;
   b. said portion of reduced cross-section is adapted to project into a portion of said opening of reduced cross-section at the edge of said panel,
   c. the larger cross-sectional portion of said body functioning to retain said body in said panel opening.
3. A fastener receptacle according to claim 2 wherein:
   a. said receptacle body has a generally circular cross-section.
4. A fastener receptacle according to claim 3 wherein:
   a. said receptacle body is frusto-conical.
5. A fastener receptacle according to claim 2 wherein:
   a. said receptacle body is plastic.
6. A fastener receptacle according to claim 2 wherein:
   a. said body has an axial bore adapted to receive a screw fastener.
7. A screw fastener receptacle adapted for installation at the edge of a thin rigid panel and adapted to receive a screw fastener for removably securing said rigid panel to a second member in such relative positions that the edge of said thin panel abuts against the surface of said second member, said receptacle comprising;
   a. a body of resilient material;
   b. an axial hole in said body for receiving a screw fastener;
   c. first and second recesses in the peripheral surface of said body at diametrically opposed locations;
   d. a slot within said body extending generally circumferentially from said first recess toward said second recess but terminating short thereof, forming a tongue integral at one end with said body and free at its other end, the free end of said tongue being movable inwardly into said slot to permit the installation of said receptacle in an opening in said panel, said tongue returning outwardly to prevent removal of said body following installation.
8. A receptacle according to claim 7 wherein:
   a. said axial bore is tapped for engaging a threaded screw fastener.
9. A receptacle according to claim 8 wherein:

a. said body has generally circular cross-sections of larger and smaller dimensions.

10. A receptacle according to claim 9 wherein:

a. said receptacle has a smaller diameter portion at one end adapted to project into an opening of reduced dimension at the edge of said panel.

11. A receptacle according to claim 10 wherein one of the side walls of said second recess is inclined, the direction of inclination being such that said recess has a larger width at the periphery of said body than at the base of said recess.

12. In combination:

a. a panel member having a shaped opening adjacent its edge;
b. the dimension of said opening at the edge of said panel member being less than the dimension of said opening along a line parallel to and inwardly from said edge of said panel;
c. a receptacle member, said receptacle member comprising:
 c-1. a body of resilient material;
 c-2. a peripheral spring element integral at one end with said body and free at its opposite end;
 c-3. a first peripheral recess adjacent to said free end of said spring element;
 c-4. a second peripheral recess located diametrically opposite said first recess;
 c-5. fastener receiving means centrally located in said body;
 c-6. said body having a reduced cross-section dimension portion adapted to be received in the lesser dimension portion of the opening at the edge of said panel;
 c-7. said first and second peripheral recesses being adapted to engage cooperatively with the side edges of the panel opening;
 c-8. said peripheral spring element being adapted to flex inwardly to pass through the opening and then to return outwardly to its unflexed position;
 c-9. said spring element in its unflexed position after having passed through said opening functioning to retain the receptacle within said panel opening.

13. The combination according to claim 12 wherein:

a. said lesser dimension portion of the opening at the edge of said panel is formed by first and second tabs which extend toward each other at the edge of said panel,
b. said reduced cross-section portion of said receptacle body is received between the said tabs;
c. the larger cross-section portion of said receptacle body is retained within the panel opening by said tabs.

14. The combination according to claim 13 wherein:

a. said fastener receiving means in said body is a tapped axial hole adapted to receive and engage a threaded screw fastener for holding a second member at the edge of said panel member.

15. In combination:

a. a first thin rigid sheet having a straight edge;
b. a second member having a flat surface against which the edge of said first sheet is to be attached in abutting relation;
c. a fastener receptacle;
d. an opening in said first sheet of a size and shape corresponding to the peripheral size and shape of said receptacle;
e. said opening being of lesser dimension at said edge of said sheet;
f. said receptacle comprising:
 f-1. a body having a generally circular cross-section;
 f-2. an axial hole in said body for receiving a screw fastener;
 f-3. first and second recesses in the peripheral surface of said body at diametrically opposed locations;
 f-4. a slot in said body extending generally circumferentially from said first recess toward said second recess but terminating short of second recess forming a tongue integral at one end with said receptacle body and free at its other end, said tongue functioning as a spring member permitting when compressed inwardly into said slot the installation of said receptacle in said panel opening but upon return to its non-compressed outward position preventing removal of said receptacle from said panel.

16. The combination of claim 15 wherein:

a. said receptacle body is generally cylindrical, and has a reduced diameter portion at one end.

17. The combination of claim 15 wherein:

a. said receptacle body is frusto-conical.

* * * * *